United States Patent
Vrzic et al.

(10) Patent No.: US 8,379,576 B1
(45) Date of Patent: Feb. 19, 2013

(54) CALL ADMISSION CONTROL SYSTEMS AND METHODS FOR WIRELESS NETWORKS

(75) Inventors: Sophie Vrzic, Nepean (CA); Kelvin Au, Ottawa (CA); Hongyi Li, Ottawa (CA); Tricci So, Kanata (CA)

(73) Assignee: Apple Inc., Cupertino, CA (US)

( * ) Notice: Subject to any disclaimer, the term of this patent is extended or adjusted under 35 U.S.C. 154(b) by 723 days.

(21) Appl. No.: 11/293,206

(22) Filed: Dec. 5, 2005

Related U.S. Application Data (60) Provisional application No. 60/632,521, filed on Dec. 3, 2004.

(51) Int. Cl.
*H04W 4/00* (2009.01)
*H04W 72/00* (2009.01)
*H04L 12/28* (2006.01)
*H04J 3/16* (2006.01)

(52) U.S. Cl. ........ 370/329; 370/333; 370/351; 370/468; 455/453

(58) Field of Classification Search .......... 370/230–234; 709/225, 227–229, 232; 713/153
See application file for complete search history.

(56) References Cited

U.S. PATENT DOCUMENTS

| | | | |
|---|---|---|---|
| 7,400,630 B1* | 7/2008 | Ji et al. | 370/395.21 |
| 7,684,334 B2* | 3/2010 | Shiokawa et al. | 370/236 |
| 2002/0064169 A1* | 5/2002 | Gummalla et al. | 370/412 |
| 2002/0114274 A1* | 8/2002 | Sturges et al. | 370/229 |
| 2002/0115427 A1* | 8/2002 | Hayashi et al. | 455/410 |
| 2002/0119783 A1* | 8/2002 | Bourlas et al. | 455/453 |
| 2002/0126699 A1* | 9/2002 | Cloonan et al. | 370/468 |
| 2002/0172152 A1* | 11/2002 | Shiokawa et al. | 370/218 |
| 2003/0026279 A1* | 2/2003 | Onoda et al. | 370/428 |
| 2003/0063624 A1* | 4/2003 | Nagarajan et al. | 370/468 |
| 2003/0076829 A1* | 4/2003 | Rabie et al. | 370/391 |
| 2003/0185217 A1* | 10/2003 | Ganti et al. | 370/395.5 |
| 2003/0206537 A1* | 11/2003 | Choi et al. | 370/333 |
| 2004/0009776 A1* | 1/2004 | Ishikawa et al. | 455/453 |
| 2004/0141479 A1* | 7/2004 | Cha et al. | 370/329 |
| 2004/0213153 A1* | 10/2004 | Nagato et al. | 370/230 |
| 2004/0228278 A1* | 11/2004 | Bruckman et al. | 370/231 |
| 2005/0213557 A1* | 9/2005 | Hwang et al. | 370/351 |
| 2006/0034438 A1* | 2/2006 | O'Neill | 379/114.07 |

* cited by examiner

*Primary Examiner* — Brandon Renner
(74) *Attorney, Agent, or Firm* — Meyertons, Hood, Kivlin, Kowert & Goetzel, P.C.

(57) ABSTRACT

The invention provides new call admission control methods for application in wireless networks such as wireless mesh networks. A separate set of call admission control constraints is applied to access links used to access the network and transit links between network nodes of the network. Both sets of constraints must be satisfied for a call to be accepted.

21 Claims, 8 Drawing Sheets

CALL ADMISSION CONTROL SYSTEMS AND METHODS FOR WIRELESS NETWORKS

RELATED APPLICATION

This application claims the benefit of U.S. Provisional Application No. 60/632,521 filed Dec. 3, 2004 hereby incorporated by reference in its entirety.

FIELD OF THE INVENTION

The present invention generally relates to the field of wireless communication networking, and more specifically to call admission controls for wireless networks.

BACKGROUND OF THE INVENTION

Call admission control (CAC) is employed in wireless networks to make decisions on whether or not to admit a new call. Such decisions are necessary in order to make sure there is capacity for the new call, and to determine if admitting the new call will have a negative effect on existing calls.

In existing call admission control mechanisms, the assumption is typically made that the capacity that limits call admission is that of the access links, and that so long as there is capacity on the access link, the backhaul network will have sufficient capacity.

SUMMARY OF THE INVENTION

A broad aspect of the invention provides a method comprising: receiving a new call request for a new call with a wireless terminal; based upon the new call request determining if the new call satisfies at least one access link CAC (call admission control) constraint; based upon said new call request determining if the new call satisfies at least one transit link CAC constraint; and making a call admission control decision as a function of whether or not the at least one access link CAC constraint and the at least one transit link CAC constraint are satisfied.

In some embodiments, the at least one access link CAC constraint comprises one of: access link CAC constraints for a network node where the request was received from the wireless terminal; access link CAC constraints for a network node where the request was received from the wireless terminal, and for a network node serving a destination wireless terminal for the call; access link CAC constraints for a network node serving the wireless terminal as a destination for the call.

In some embodiments, the at least one transit link CAC constraint comprise transit link constraints for each transit link designated to handle traffic for the call if accepted.

In some embodiments, transit link constraints for each transit link designated to handle traffic for the call if accepted comprise one of: transit link constraints for transit links in a path between a network node where the request was received from the wireless terminal and another network node serving a destination wireless terminal for the call; transit link constraints for transit links in a path between a network node where the request was received from the wireless terminal and a network access point; and transit link constraints for transit links in a path between a network node serving the wireless terminal as a destination for the call and a network access point.

In some embodiments, the transit links form part of a wireless network, and access link CAC constraints are assessed by a least one network node delivering an access link for the call, and transit link CAC constraints are assessed in a distributed manner by network nodes implementing the transit links.

In some embodiments, transit link CAC constraints are assessed in a distributed manner by nodes implementing the transit links by propagating a CAC communication along a path or paths designated to handle the call.

In some embodiments, the method is for execution by a source node, and making a call admission control decision as a function of whether or not the at least one access link constraint and the at least one transit link constraint are satisfied comprises: if the at least one access link constraint is not satisfied, rejecting the call; outputting a CAC communication for propagation along transit links selected to handle the call for use in determining whether each transit link can handle the call in response to the outputting the CAC; if the at least one transit link constraint is not satisfied, rejecting the call, the at least one transit link constraint being in respect of a transit link from the source node; if the new call satisfies the at least one access link CAC constraint and the at least one transit link CAC constraint, and there is no further upstream transit link in a path for the call, accepting the call; if the new call satisfies the at least one access link constraint and the at least one transit link constraint and there is a further transit link in the path, sending a CAC communication in an upstream direction; receiving a CAC communication in a downstream direction in response to sending the CAC communication in the upstream direction; making the CAC decision based on the CAC communication in the downstream direction.

In some embodiments, the method involves processing each new call request by: a) if the at least one access link constraint is not satisfied, rejecting the call; b) if the at least one transit link constraint is not satisfied, rejecting the call; c) if the new call satisfies the at least one access link constraint and the at least one transit link constraint, and there is no further transit link in a path for the call, accepting the call; d) if the new call satisfies the at least one access link constraint and the at least one transit link constraint and there is a further transit link in the path, sending a CAC communication in an upstream direction. The method further comprises processing CAC communication received in the downstream direction by: e) if the CAC communication is received by a source node, making the CAC decision based on the CAC communication in the downstream direction; f) if the CAC communication is received by other than the source node, forwarding the CAC communication downstream. The method further comprises processing CAC communications received in the upstream direction by: g) determining if CAC transit link constraints for a next transit link are satisfied; h) if the CAC transit link constraints for the next transit link are not satisfied, sending a CAC communication downstream rejecting the call; i) if the CAC transit link constraints for the next transit link are satisfied and that is the last transit link in the path, sending a CAC communication downstream accepting the call; j) if the CAC transit link constraints for the next transit link are satisfied and that is not the last transit link in the path, forwarding the CAC communication upstream.

Another embodiment provides a wireless network node adapted to implement any one of the above-summarized methods.

Another embodiment provides a computer readable medium having computer executable instructions stored thereon that when executed on one or more network nodes perform one of the above-summarized methods.

Another embodiment of the invention provides a wireless mesh network adapted to implement any of the above-summarized methods.

According to another broad aspect, the invention provides a system comprising: an access link antenna system; a transit link antenna system; a transit radio connected to the transit link antenna system and configured to communicate with neighbouring network nodes over transit links using the transit link antenna system; and a communications controller operable to: receive a new call request for a new call from a wireless terminal via the access link antenna system; make a CAC decision as a function of whether or not the at least one access CAC link constraint and the at least one transit link CAC constraint are satisfied; based upon said new call request determine if the new call satisfies at least one transit link CAC constraint in respect of a transit link to a neighbouring node; and based upon the new call request determine if the new call from the wireless terminal satisfies at least one access link CAC constraint.

In some embodiments, the system is implemented as part of a single wireless network node.

Another embodiment provides a wireless network comprising a plurality of such wireless network nodes.

In some embodiments, the transit links between the plurality of wireless network nodes form a wireless mesh.

According to another broad aspect, the invention provides a wireless mesh network comprising: a plurality of wireless network nodes each having an access link antenna system and a transit link antenna system, the plurality of wireless network nodes being interconnected with transit links to form a wireless mesh; the wireless network being adapted to perform call admission control by: receiving a new call request for a new call with a wireless terminal; based upon said new call request determining if the new call request satisfies at least one access link CAC (call admission control) constraint; based upon said new call request determining if the new call satisfies at least one transit link CAC constraint; and making a call admission control decision as a function of whether or not the at least one access link CAC constraint and the at least one transit link CAC constraint are satisfied.

In some embodiments, the at least one access link CAC constraint comprises one of: access link CAC constraints for a network node in the mesh network where the request was received from the wireless terminal; access link CAC constraints for a network node in the mesh network where the request was received from the wireless terminal, and for a network node in the mesh network serving a destination wireless terminal for the call; access link CAC constraints for a network node in the mesh network serving a destination wireless terminal for the call.

In some embodiments, the at least one transit link CAC constraint comprise transit link constraints for each transit link designated to handle traffic for the call if accepted.

In some embodiments, transit link constraints for each transit link designated to handle traffic for the call if accepted comprise one of: transit link constraints for transit links in a path between a network node in the mesh network where the request was received from the wireless terminal and another network node serving a destination wireless terminal for the call; transit link constraints for transit links in a path between a network node in the mesh network where the request was received from the wireless terminal and a network access point; transit link constraints for transit links in a path between a network node in the mesh network serving the wireless terminal as a destination for the call and a network access point.

In some embodiments, the transit link CAC constraints are assessed in a distributed manner by network nodes by propagating a CAC communication along a path or paths of transit links designated to handle the call.

In some embodiments, the wireless mesh network further comprises at least one network access point and wherein call admission control is performed for calls received at the network access point for wireless terminals served by the wireless mesh network.

DETAILED DESCRIPTION OF EMBODIMENTS OF THE INVENTION

Wireless access networks have access points that provide access links over which access to the networks is provided and a backhaul network that interconnects the access points and possibly also interconnects the network to external networks.

When making call admission decisions for a wireless access network, the assumption of sufficient capacity on the backhaul network is usually valid where the backhaul network is a wireline network, for example in typical cellular networks. However, the assumption may not be valid in wireless access networks that employ a network of wireless transit links in the backhaul network. Networks of wireless transit links may also suffer from capacity limitations that can limit how many calls can be admitted. These capacity limitations may even change over time either due to changes in the topology of the wireless transit links due to the installation or removal of wireless network nodes, or to changes in the connectivity between nodes in the wireless network due to a change in the ability for neighbours to communicate, for example due to the addition or removal of trees or buildings.

A new call admission procedure is provided that makes call admission decisions based on both the access link capacity, and the capacity of transit links. In the detailed examples that follow, the wireless transit links are assumed to form a wireless mesh network, but the call admission procedure has applications to other topologies of wireless transit links as well.

Figure 1:
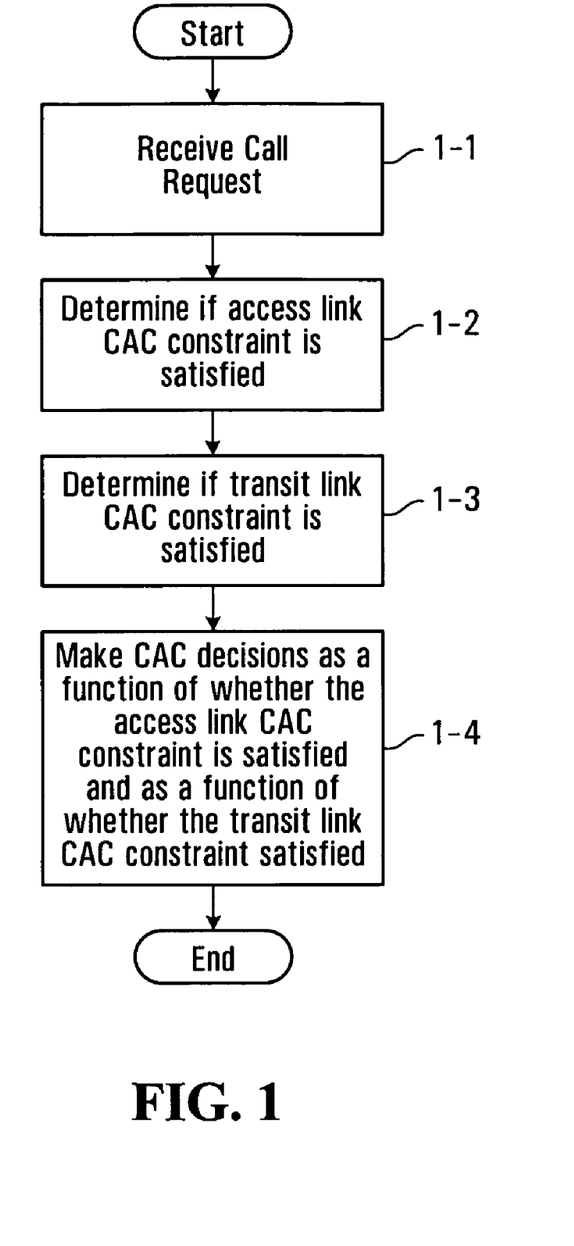
FIGS. 1, 2 and 3 are flowcharts of call admission control methods provided by embodiments of the invention.

The call admission control procedure will be described with reference to the flowchart of FIG. 1. The procedure begins at step 1-1 when an call request for a new call is received from a wireless terminal. A call request is any request for communications that can be accepted or declined, for example, a voice call. The types of call supported may be application specific. The request contains information about the traffic characteristics such as the required delay bound if the requested call is delay sensitive and the average packet inter-arrival rate. Step 1-2 involves, based upon the call request, determining if the new call from the wireless terminal satisfies an access link CAC constraint. More generally, there can be one or more access link CAC constraints. Step 1-3 involves, based upon the call request, determining if the new call from the wireless terminal satisfies a transit link CAC constraint. More generally, there can be one or more transit link CAC constraints. At step 1-4, a call admission decision is made as a function of whether the access link CAC constraint(s) is satisfied and as a function of whether the transit link CAC constraint(s) is satisfied.

In some embodiments, determining if the new call satisfies the access link CAC constraints and transmit link CAC constraints involves making an estimate or otherwise determining a metric that reflects an amount of access link and/or transit link capacity that the new call will require. This might, for example reflect the average amount of traffic on both the uplink and the downlink.

In some embodiments, the call admission control algorithms are applied in the context of wireless mesh network nodes operating in accordance with the IEEE 802.11e standard (which is hereby incorporated by reference).

In some embodiments, the step of determining whether the transit link CAC constraint is satisfied is implemented by a single network node that features both access link and transit link capability.

In other embodiments, the transit link CAC constraints of every transit link through the network of wireless transit links that would carry the traffic need to be satisfied.

Figure 2:
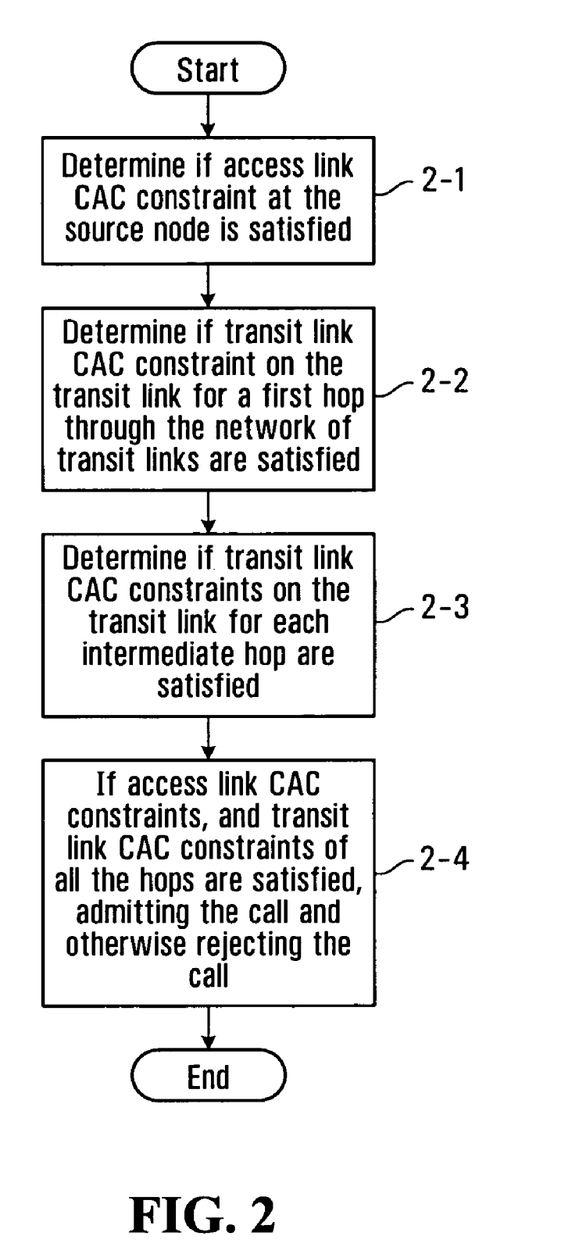

Referring now to FIG. 2, another call admission control method provided by an embodiment of the invention will now be described. The method begins at step 2-1 with determining if the new call satisfies the constraints on the access link at the source node, namely the access node that will serve the call. The method continues at step 2-2 with determining if the new call satisfies the constraints on the transit link for the first hop through the network of transit links. For implementations where the access nodes and transit nodes are implemented as combined access+transit nodes, this is a transit link from the access node that will serve the call. If the constraints of the access node and the first transit link are satisfied, then at step 2-3 the step of determining if the new call satisfies the constraints on the transit link of each intermediate hop. At step 2-4, if the access link CAC constraints and the transit link CAC constraints of all of the hops are satisfied, the call is admitted. Otherwise, the call is rejected.

Figure 3:
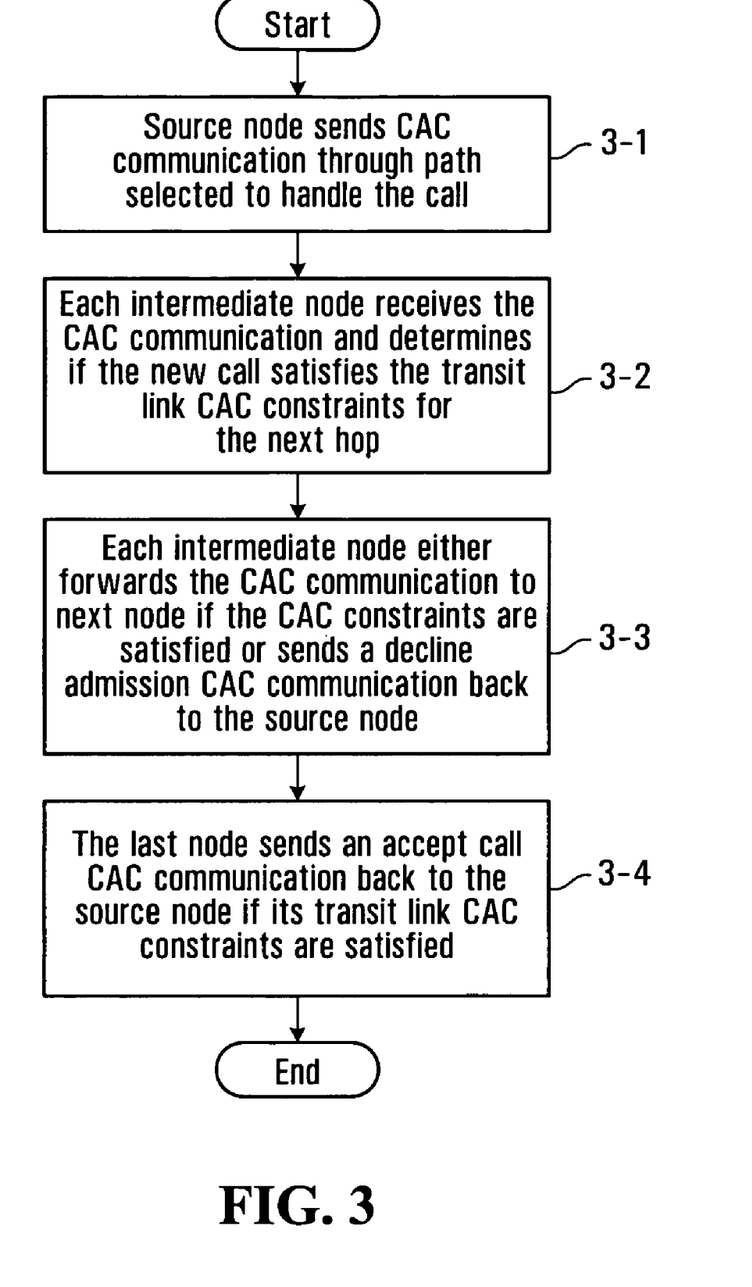

FIG. 3 is a flowchart of a particular method of determining whether the transit link CAC constraints of each hop are satisfied that involves propagating a CAC communication from the source node up the path through the network of transit links, that has been selected to handle traffic for the call at step 3-1. At step 3-2, each intermediate node that receives the CAC communication determines if the new call can satisfy the transit link constraint for the next hop. At step 3-3, if a node cannot accommodate the new call, a decline admission CAC communication is sent back to the source node. Otherwise, the CAC communication is relayed to the next node. At step 3-4, when the last node serving the last hop receives the call, if the transit link CAC constraints are satisfied, an accept call CAC communication is propagated back to the service node and the call is admitted. The CAC communications can take any appropriate form, for example, messages, packets, flags, fields in messages, etc.

According to one embodiment of the invention the following constraint is applied as an access link CAC constraint:

$$\left[\left(\sum_{i=1}^{N_v}(R_{v,i}^{(UL)}+R_{v,i}^{(DL)})\right)+\left(\sum_{i=1}^{N_d}(R_{d,i}^{(UL)}+R_{d,i}^{(DL)})\right)+R_{new}^{(UL)}+R_{new}^{(DL)}\right]\leq R$$

where for the access link in question:

$N_v$ is the number of voice users;

$R_{v,i}^{(UL)}$ is the capacity requirement for the ith voice user on the uplink;

$R_{v,i}^{(DL)}$ is the capacity requirement for the ith voice user for the downlink;

$N_d$ is the number of data users;

$R_{d,i}^{(UL)}$ is the capacity requirement for the ith data user on the uplink;

$R_{d,i}^{(DL)}$ is the capacity requirement for the ith data user for the downlink;

$R_{new}^{(UL)}$ is the capacity requirement for the new user for the uplink (voice and/or data); and $R_{new}^{(DL)}$ the capacity requirement for the new user for the downlink.

The rates for the different services are effective data rates that include the transmission overhead per packet as well as the overhead due to retransmissions.

It is readily apparent how the above expression can be modified in the context of applications that feature only voice users, only data users, or systems that feature additional types of users. In some implementations, CAC decisions can be made on the basis of combined services (for example voice and data) for a new user. In other implementations, a separate CAC decision is made for each service.

According to one embodiment of the invention the following constraint is applied as an access link CAC constraint:

$$t_{assign} \leq t_{start} + D_B$$

where $D_B$ is the delay bound for the new call and $t_{assign}$ and $t_{start}$ are the assigned start time and the user's requested start time, respectively.

In some embodiments, both of the above constraints are applied as access link CAC constraints.

The following is a particular example of how an effective data rate might be computed. With this particular example, it is assumed that a given user gets blocks of transmit capability referred to as transmit channel usage duration. Of course completely different scheduling approaches are possible. For this example:

$$B_{v,i}^{(UL)} = T_{v,i}^{(UL)} R$$

$$R_{v,i}^{(UL)} = \frac{B_{v,i}^{(UL)}}{T_{service,v,i}}(1+FER_{v,i})$$

In the above equations:

the variable $T_{v,i}^{(UL)}$ is the channel usage duration used for transmission plus the time required to obtain the channel;

$B_{v,i}^{(UL)}$ is the number of bits that can be sent during a time of $T_{v,i}^{(UL)}$ at a link rate of R, $T_{service,v,i}^{(UL)}$ is the service rate on the uplink for voice user i; and $FER_{v,i}$ is the frame error rate after the first transmission.

Transit Link Constraints

The following equations provide an example of a constraint that can be applied on for the transit link:

$$T_{UL} = \left(\frac{B_v^{(UL)}+B_{OH}}{R}N_v^{(UL)}(T_{SIFS}+T_{ACK})\right)+$$
$$\left(\frac{R_d^{*(UL)}T_c+B_{OH}}{R}+N_d^{(UL)}(T_{SIFS}+T_{ACK})\right)+X_{new}^{(UL)}$$

$$T_{DL} = \left(\frac{B_v^{(DL)}+B_{OH}}{R}+N_v^{(DL)}(T_{SIFS}+T_{ACK})\right)+$$

$$T_{DL} + T_{UL} + T_{margin} \leq T_s - \overline{T}_{RBO} \left( \frac{R_d^{*(DL)}T_c + B_{OH}}{R} + N_d^{(DL)}(T_{SIFS} + T_{ACK}) \right) + X_{new}^{(DL)}$$

where:

$B_v^{(UL)}$ and $T_v^{(DL)}$ are the number of traffic bits for all the voice users on the uplink and downlink respectively;

$R_d^{*(UL)}$ and $R_d^{*(DL)}$ are the minimum required bit rates for data users on the uplink and downlink respectively;

$B_{OH}$ is the number of bits for the MAC and PHY overhead;

$N_v^{(UL)}$ and $N_v^{(DL)}$ are the number of voice packets on the uplink and downlink respectively;

$T_{SIFS}$ and $T_{ACK}$ are the duration of the SIFS and the ACK respectively;

R is the link rate;

$T_c$ is the cycle time;

$T_s$ is the slot time;

$T_{RBO}$ is the average random back-off time to obtain all the TXOPs in the given slot time;

$X_{new}^{(UL)}$ and $X_{new}^{(DL)}$ the times required for serving the new user on the uplink and downlink, respectively; and $T_{margin}$ is a time margin that might be reserved for serving emergency calls and handoff calls on both the uplink and downlink.

For purposes of providing support and context for the negotiation schemes described above, FIGS. 4 and 5 illustrate a wireless communication network and wireless network node respectively in accordance with an embodiment of the invention.

Figure 4:
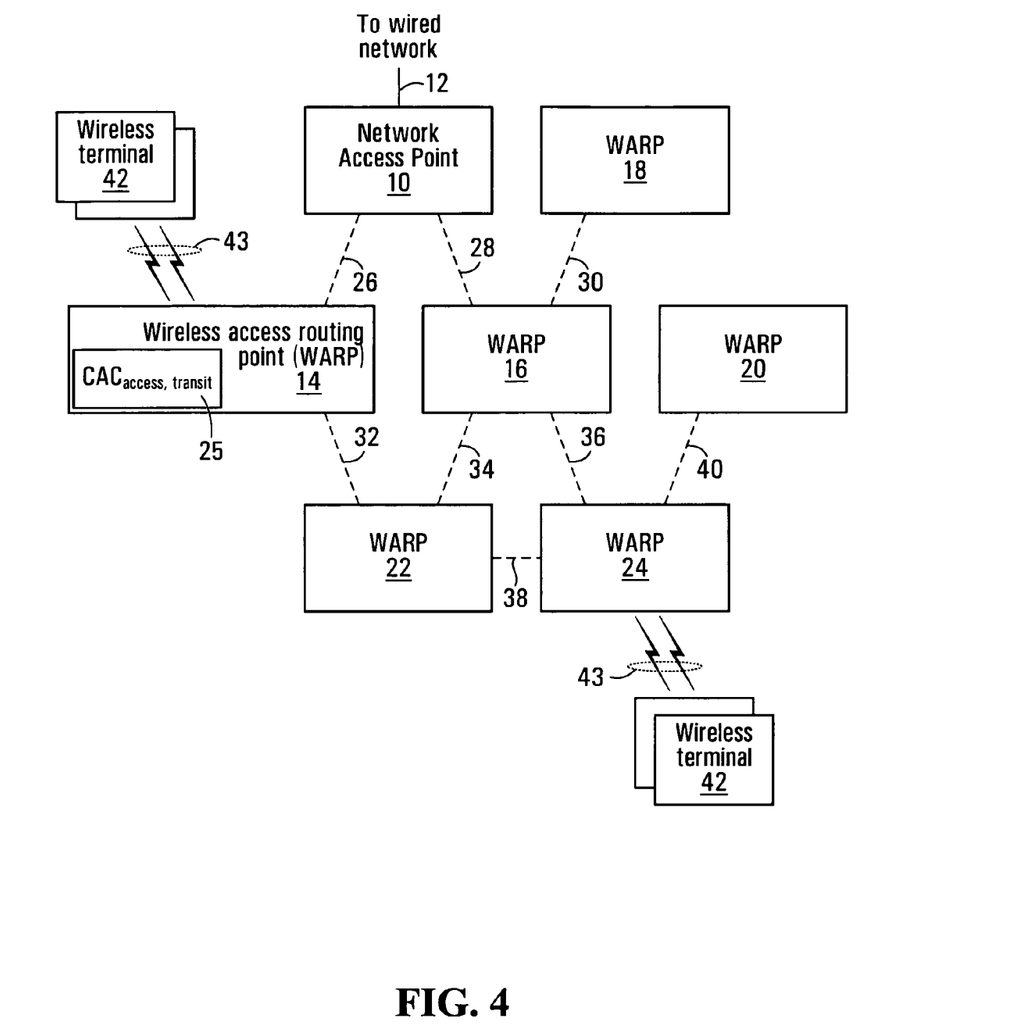
FIG. 4 is a block diagram of a distributed wireless communication network in accordance with an embodiment of the invention.

FIG. 4 is a block diagram of a distributed wireless communication network, in which the present invention may be implemented. The wireless communication network has a plurality of wireless access routing points (WARPs) 14, 16, 18, 20, 22, and 24 that are distributed about a region to be covered, and a plurality of wireless transit links 26, 28, 30, 31, 32, 34, 36, 38, and 40 that interconnect the WARPs. The WARPs and transit links collectively constitute a wireless mesh network that provides a wireless mesh transport for traffic to and from wireless terminals accessing the network. Several such wireless terminals are indicated at 42 communicating with WARPS over access links 43. While in the illustrated example, the interconnectivity forms a mesh, embodiments have application to other topologies, for example a topologies.

In the event the network is to be connected externally, typically the case, one or more NAPS (network access points) 10 are provided for connection to external networks over connection 12. An example of such an external network is a wired backbone network such as the Internet. Connection 12 is typically a broadband wireline connection but other implementations are possible.

Each of the WARPS 14-24 features a $CAC_{access, \; transit}$ element (CAC function with access link constraints and transit link constraints) 25 although this is only shown in WARP 14 in the drawing for simplification. The $CAC_{access, \; transit}$ element 25 can be implemented using any suitable one or combination of hardware, software, firmware etc.

The network shown in FIG. 4 is a particular example of the type of communication network to which the present invention is applicable. The invention is in no way restricted to the particular network of FIG. 4, and may be implemented in other types of networks having different numbers and types of network nodes, for instance.

In operation, the communication network shown in FIG. 4 enables subscribers with suitable wireless terminals to receive various services by accessing the network. Preferably, each of the WARPS supports both network access and transit functionality. In other embodiments, a set of wireless network nodes is provided each of which supports either both network and transit functionality or only transit functionality (i.e. some dedicated transit nodes). In yet further embodiments, dedicated access nodes are provided that provide access functionality only. Access and transit functionality is co-located in each WARP in FIG. 4, and in the description that follows, the assumption is made that each WARP supports both access and transit functionality.

Access capabilities are preferably afforded by the provision of one or more antennas for communication with wireless terminals of a variety of different types. These might include for example wireless personal digital assistants (PDAs), personal computers, and hybrid telephony-data terminals. In other implementations, these antennas are in the form of omni-directional antennas or arrays of directional antennas arranged to provide up to 360 degree coverage. Two or more access antennas are often provided at each node for diversity purposes. Whereas omni-directional antennas typically provide broader coverage with a single antenna element, directional antennas or arrays tend to have higher gain and can provide a more focused access coverage area if desired.

Transit capabilities can be enabled using an array of directional antennas that provide for directional communication with other network nodes or, for example, wireless backhaul. An antenna array may comprise as few as two antenna elements, although arrays of six or more antennas are more common to afford a reasonable degree of directional association for each antenna. As those skilled in the art will appreciate, the number of antenna elements required to provide a full 360 degrees of transit link coverage for a network node increases with the directionality of the antenna elements in the array antenna at that node. That is, the more directional the antenna elements in the array, the greater the number of elements required to provide 360 degree coverage. The antenna elements of a directional array are also preferably arranged to include diversity, in the form of space or polarization diversity. Polarization diversity has the advantage that a more compact array may be implemented.

In operation, each wireless terminal 42 communicates directly with one of the WARPs (and possibly the NAP 10 where the NAP 10 also supports access functionality), typically but not necessarily the WARP that is physically the nearest to the particular wireless terminal. The WARP providing access capability for a given communication will be referred to as the "source node". Communication between the wireless terminal and the source node uses an access radio in the source node. The WARPs 14-24 route traffic throughout the network, and possibly outside the network through the NAP 10, via transit links 26-40. Traffic is also forwarded, as necessary, between the WARPs 14-24 to reach wireless terminals within the network. The $CAC_{access, \; transit}$ element 25 makes call admission decisions based on both access link constraints and transit link constraints, for example using one of the methods described previously.

Communication over the transit links is preferably coordinated such that each transit link beam at a network node is aligned with neighbouring network nodes. Example methods of transit link coordination are taught in commonly assigned U.S. patent application Ser. Nos. 11/239,336 filed Sep. 30, 2005 entitled "Method of Scheduling with Multiple Radios Per Node in a Wireless Multihop Network" and 10/682,089 filed Oct. 10, 2003 entitled "Transit Link Coordination Systems And Methods For A Distributed Wireless Communication Network", entitled "Systems and Methods for Wireless Netork Negotiation" hereby incorporated by reference in their entirety. More generally, any appropriate mechanism for handling the traffic on the wireless mesh can be implemented.

Figure 5:
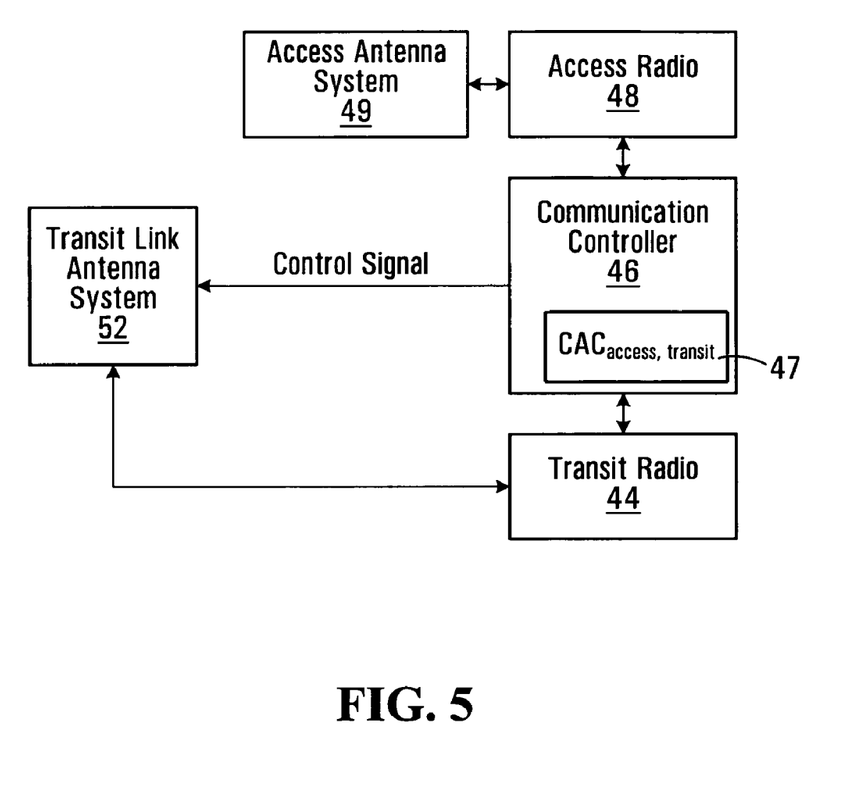
FIG. 5 is a block diagram of a wireless access routing point in accordance with an embodiment of the invention.

FIG. 5 is a block diagram of a WARP in accordance with an embodiment of the invention. Each of the WARPs 14-24 of FIG. 4 preferably has a similar structure to the WARP shown in FIG. 5, but other implementations are possible. The WARP in FIG. 5 has an access radio 48 connected to an access antenna system 49. There is a communications controller 46 connected to the access radio 48, a transit radio 44, and a transit antenna system 52 that is also connected to the transit radio 44. A WARP may also include further components that have not been shown in FIG. 5 to avoid congestion in the drawing. Furthermore, while a very specific set of interconnections between the various components of FIG. 5 has been shown, it is to be understood that components may be interconnected differently, or a smaller number of interconnections/components implemented with one or more functions combined.

The communications controller has a $CAC_{access,\ transit}$ function (CAC function with access link constraints and transit link constraints) 47 although this is only shown in WARP 14 in the drawing for simplification. The $CAC_{access,\ transit}$ function 25 can be implemented using any suitable one or combination of hardware, software, firmware etc. The $CAC_{access,\ transit}$ function 25 makes call admission decisions based on access link constraints and transit link constraints, for example using one of the methods described previously.

While in the illustrated example, the $CAC_{access,\ transit}$ function 25 is shown implemented as part of the communications controller, it can alternatively be implemented as part of one of the other components illustrated or as a separate component.

The access radio 48 and the access antenna system 49 support a network access function for wireless terminals (not shown) located within an access coverage area of the WARP. The access radio 48 performs such operations as communication signal frequency conversion, filtering, encoding and decoding, and modulation and demodulation, for example. The access antenna system 49 transmits communication signals to and receives communication signals from wireless terminals, and comprises either a single antenna element or multiple antenna elements such as main and diversity antenna elements. The access antenna system may for example include space and/or polarization diversity.

The operation of the communications controller 46 is dependent upon the design and configuration of the WARP. Generally, a communications controller handles such control functions as routing of communication signals between the transit radio 44 and the access radio 48 and control of scanning operations by the transit radio 44 and the access radio 48. In one example embodiment, the communications controller 46 receives packets from the access radio 48, stores them briefly in suitable memory if needed, determines an appropriate transit radio link for a destination or a next hop in a path to a destination, and forwards the packets through the selected transit radio link via the transit radio 44.

The communications controller 46 also determines an appropriate one of a plurality of transit link operating modes and provides a control signal to the transit link antenna system 52. The transit radio 44 performs operations similar to those of the access radio 48, to support transit links to one or more other WARPs. The access radio 48 and the transit radio 44 typically employ different frequency bands, and possibly different encoding and modulation schemes. For example, in one embodiment, the access radio 48 is an 802.11b/g module operating at 2.4 GHz, whereas the transit radio 44 is an 802.11a module operating in the 5.15 and 5.85 GHz bands. It is to be appreciated, however, that the present invention is applicable to other sets of frequencies for one or both the access and transit functions and to other radio system standards, such as IEEE 802.16a.

The transit link antenna system 52 transmits and receives communication signals over wireless transit links. In order to mitigate co-channel interference arising from multiple simultaneous transmissions over several transit links, directional antennas are preferably employed in the transit link antenna system 52 for the transit radio links. Directional antennas provide two useful properties: increased gain, which provides greater range, and directional azimuth and elevation beam patterning, which provides attenuation to unwanted co-channel and adjacent channel interferers.

Figure 6A:
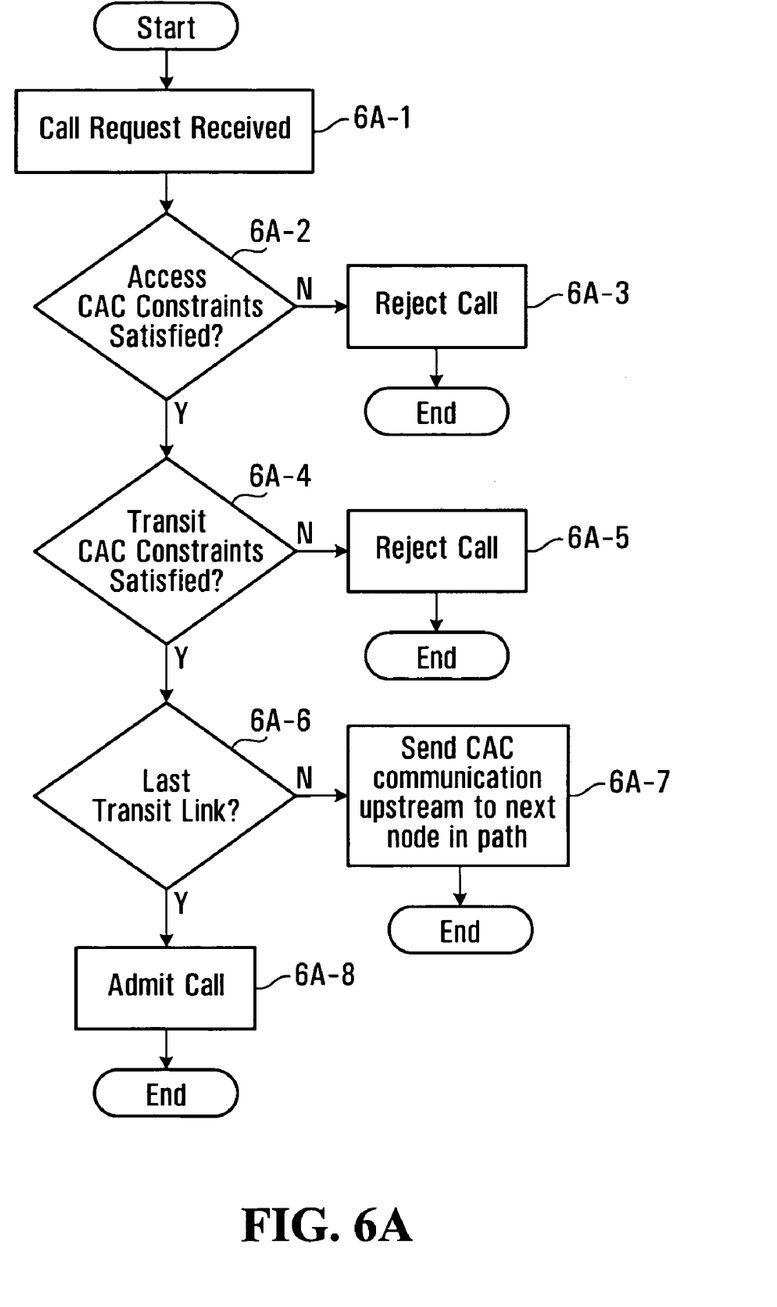
FIGS. 6A, 6B and 6C are flowcharts of further call admission control methods provided by embodiments of the invention.
Figure 6B:
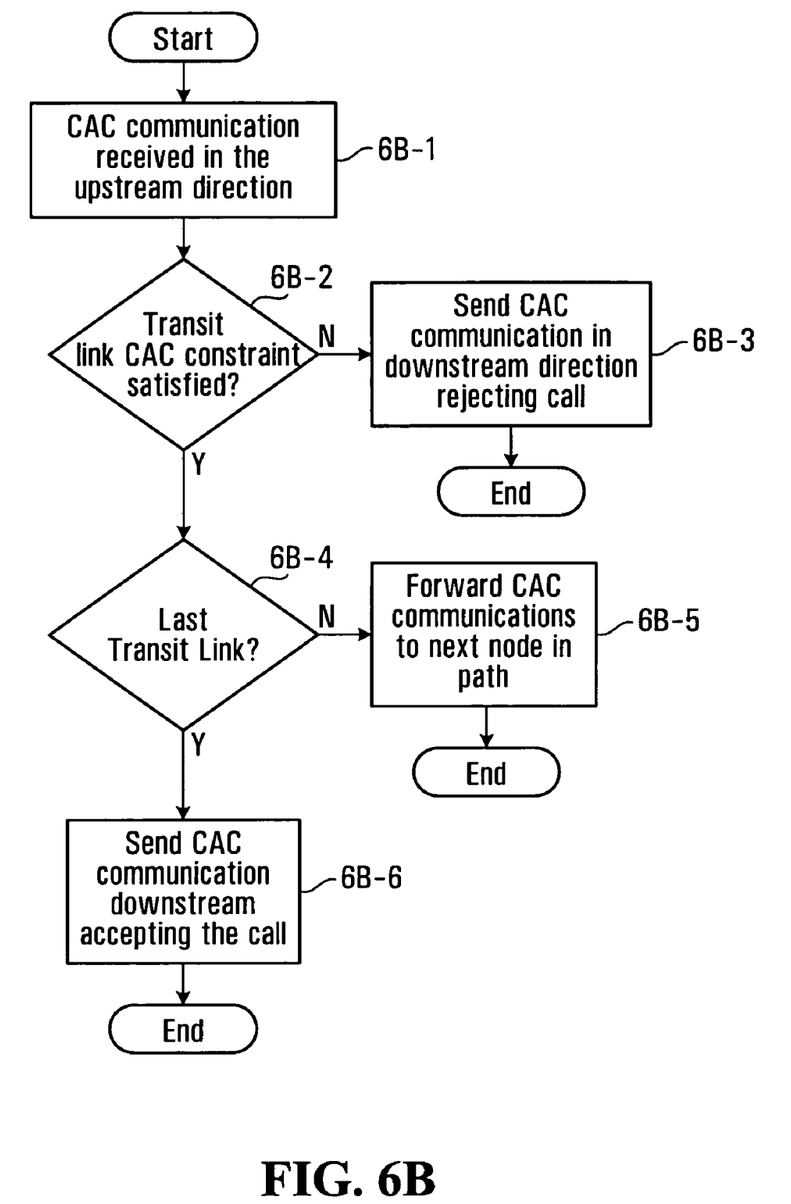
Figure 6C:
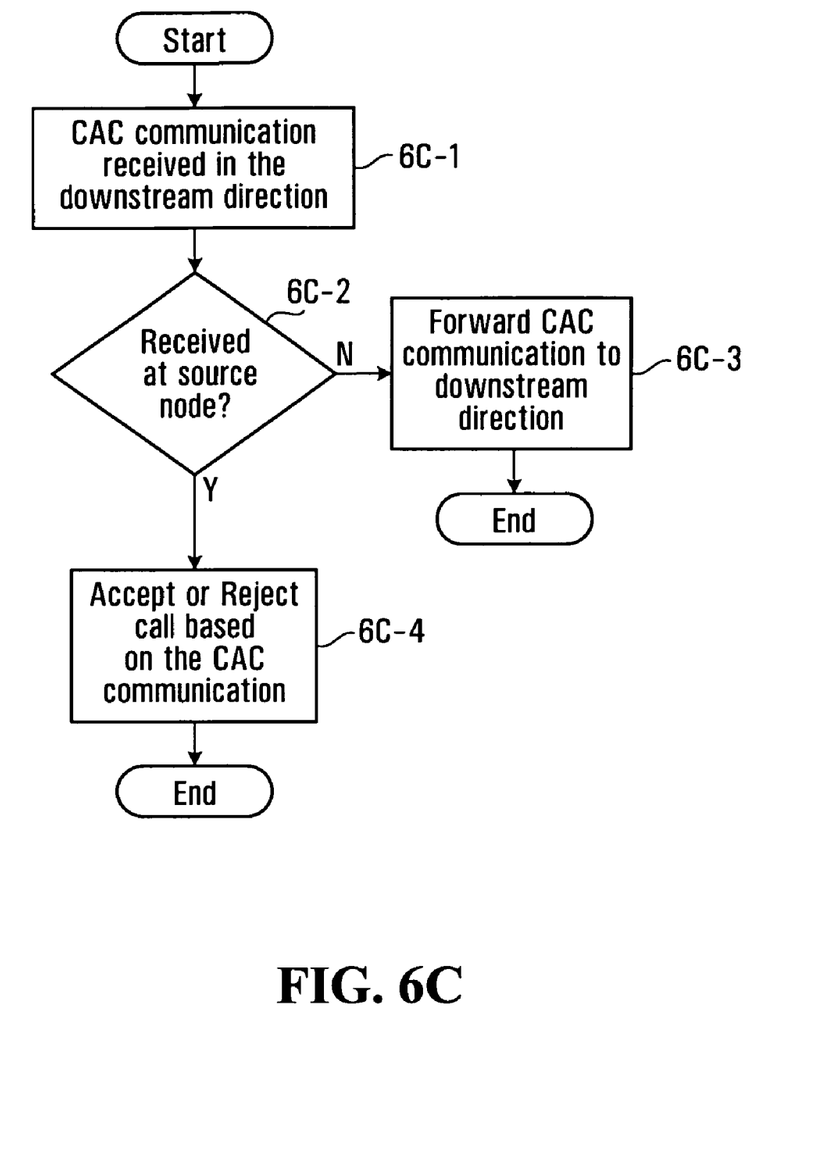

Referring now to FIGS. 6A, 6B, 6C a very specific set of methods that might be implemented in each WARP, for example by the $CAC_{access,\ transit}$ element of FIGS. 4 and 5 below, will be described. These methods assume that three different types of communications concerning CAC need to be handled in each node. The first of these is a call request the processing of which is described in FIG. 6A. The second is a CAC communication received in the upstream direction, described in FIG. 6B. The third is a CAC communication received in the downstream direction, described in FIG. 6C. A call request is what is received from a wireless terminal in association with an initial request for access to the system. It is assumed that upon receipt of such a request, a path through the wireless network that traffic for the new call would take can be determined. Any appropriate mechanism of determining this path can be employed. In one particular example, an OSPF (open shortest path first) algorithm is employed. Knowledge of such a path by any node along the path enables it to forward communications either upstream or downstream along the path.

Referring first to FIG. 6A, upon receipt of an call request 6A-1, a determination is made of whether the access CAC constraints are satisfied at step 6A-2. If not, then at step 6A-3 the call is rejected. If the access CAC constraints are satisfied (yes path, step 6A-2) then a determination is made of whether the transit CAC constraint are satisfied for the first transit link at step 6A-4. If not, the call is rejected at step 6A-5. If the transit CAC constraints are satisfied, and if that is the last transit link, i.e. the only transit link, (step 6A-6, yes path) then the call is admitted at step 6A-8. On the other hand, if it is not the last transit link (step 6A-6, no path), then a CAC communication is transmitted upstream to the next node in the path at step 6A-7. The CAC communication can take any appropriate form. However, preferably it does include enough information to allow a determination of an approximate capacity requirement for the new connection to be determined. This can involve including a capacity within the communication or including some kind of a pointer or code referencing a capacity. The CAC communication might be a single or a multiple message or and/or information elements transmitted using any appropriate communications protocol. Every node in the system that has access capability implements the method of FIG. 6A upon the receipt of a call request.

FIG. 6B is a flowchart for processing upon receipt of a CAC communication in the upstream direction at step 6B-1. A determination is made of whether the CAC constraints for the next transit link are satisfied at step 6B-2. If not, then a CAC communication is sent in the downstream direction rejecting the call at step 6B-3. If the transit link CAC constraints are satisfied (yes path, step 6B-2) then if that transit link is the last transit link (yes path, step 6B-4) then a CAC communication is sent downstream except in the call at step 6B-6. On the other hand, if it is not the last transit link (no path, step 6B-4) then the CAC communication is forwarded to the next node in the path at step 6B-5. Preferably the method of FIG. 6B is implemented by each node within the network that provides transit link capability.

Referring now to FIG. 6C, this flowchart is for processing that occurs upon receipt of a CAC communication in the downstream direction at step 6C-1. If the communication is received by source node at step 6C-2, i.e. the node that received the initial call request, (yes step, 6C-2), then the call is accepted or rejected based on the CAC communication at step 6C-4. On the other hand if the CAC communication is received at a node that is not the source node (no path, step 6C-2, then the CAC communication is forwarded on in the downstream direction at step 6C-3. Preferably the method of FIG. 6C is implemented by each node within the system that implements transit link functionality and access link functionality.

The above-described embodiments and examples have assumed that all calls begin with a request to an access node from a wireless terminal. Preferably, similar call admission control process is followed for calls that do not begin with a request to an access node from a wireless terminal. An example of this is when a terminal outside the domain of the wireless network with access to the network through a network access point, is requesting connectivity with a wireless terminal served by the wireless network. Preferably, the network access point, or some other component captures and interprets incoming signalling messages to determine if there is a request for a new call, and if so, instigates a call admission control procedure. In this case, the access constraints of the network node serving the wireless terminal need to be satisfied, together with the transit link constraints from the network access point to the network node providing access to the wireless terminal. This can be achieved with a simple modification to the above-discussed CAC communications. The network access point propagates the CAC communication towards the network node providing access to the wireless terminal with transit link CAC constraints being verified along the way. The network node providing access then verifies the access link CAC constraints. The call is admitted if all the transit link CAC constraints and the access link CAC constraints are satisfied. Alternatively, the signalling can be allowed to propagate through to the node providing access which then functions as a source node in performing CAC as described in previous embodiments, initiating the CAC procedure by verifying access link CAC constraints, and then looking at transit link CAC constraints.

If a call is between two wireless terminals on the same wireless network, preferably access link CAC constraints for two access links are considered, one for each of the two wireless terminals, together with transit link CAC constraints. There are various sequences for considering these constraints. In a particular example, the access link CAC constraints at the node that received the initial call request can be considered first, followed by transit link constraints, followed by access link CAC constraints at the node providing access to the destination wireless terminal. In this case, once the access link CAC constraints at the node providing access to the destination wireless terminal are satisfied, the call can be accepted.

The examples described are for the special case where the path from the source to the destination is the same as the path going back to the source. In some embodiments, the path from the source to the destination is allowed to be different from the path going back to the source. If the two paths are different then the traffic is budgeted in one direction at a time. This amounts to having separate transit link CAC constraints for an upstream path and a downstream path that all need to be satisfied in order to admit a call. In an example implementation, after the access link constraints of a source node are satisfied, a CAC communication can be propagated upstream with transit link CAC constraints for one way (upstream) traffic being verified along the way. At the destination (either an access node serving a destination wireless terminal or a network access point or other device providing external connectivity) the CAC communication is turned around and propagated downstream back to the source node with transit link CAC constraints for one way (downstream) traffic being verified along the way.

Numerous modifications and variations of the present invention are possible in light of the above teachings. It is therefore to be understood that within the scope of the appended claims, the invention may be practiced otherwise than as specifically described herein.

What is claimed is:

1. A method for execution in a wireless network comprising a backhaul network and access points configured to provide wireless terminals with wireless access to the wireless network, the method comprising:
  receiving a new connection request for a new connection with the wireless network from a wireless terminal;
  based upon the new connection request:
    determining if the new connection satisfies at least one access link CAC (call admission control) constraint concerning capacity of external access to the wireless network by the wireless terminal;
    outputting a first upstream CAC communication for propagation along a path of transit links selected to handle the new connection for use in determining whether each transit link can handle a voice service associated with the new connection;
    outputting a second upstream CAC communication for propagation along the path of transit links selected to handle the new connection for use in determining whether each transit link can handle a data service associated with the new connection;
    receiving a first downstream CAC communication from a network node in the path in response to the first upstream CAC communication;
    receiving a second downstream CAC communication from a network node in the path in response to the second upstream CAC communication;
  making a first CAC decision based on the at least one access link CAC constraint and a first transit link CAC constraint, the first transit link CAC constraint based on the first downstream CAC communication; and
  making a second CAC decision based on the at least one access link CAC constraint and a second transit link CAC constraint, the second transit link constraint based on the second downstream CAC communication.

2. The method of claim 1 wherein the new connection request was received from the wireless terminal, and the at least one access link CAC constraint comprises an access link CAC constraint for a network node where the new connection request was received from the wireless terminal.

3. The method of claim 1 wherein the transit links form part of the wireless network, and access link CAC constraints are assessed by at least one network node delivering an access link for the new connection, and the first and second transit link CAC constraints are assessed in a distributed manner by network nodes implementing the transit links.

4. The method of claim 3 wherein the first and second transit link CAC constraints are assessed in the distributed manner by the network nodes implementing the first and second transit links by propagating the first and second upstream CAC communications along the path or paths selected to handle the new connection.

5. The method of claim 1, wherein the path of the transit links further comprises at least one intermediate network node and a last network node, wherein the at least one intermediate network node forwards the first upstream CAC communication to a next network node in the path if the new connection satisfies a transit link CAC constraint associated with the at least one intermediate network node, and sends the first downstream CAC communication if the new connection does not satisfy the transit link CAC constraint, and wherein if the last network node receives the first upstream CAC communication the last network node sends the first downstream CAC communication based on a transit link CAC constraint associated with the last network node.

6. The method of claim 1, wherein the new connection request was received from the wireless terminal, and the at least one access link CAC constraint comprises access link CAC constraints for a first network node serving the wireless terminal and for a second network node serving a destination wireless terminal for the new connection.

7. The method of claim 1, wherein the new connection request was received from a terminal other than the wireless terminal, and the at least one access link CAC constraint comprises access link CAC constraints for a network node serving the wireless terminal for the new connection.

8. The method of claim 1 wherein the new connection request was received from the wireless terminal, and the first and second transit link constraints for each transit link designated to handle traffic for the new connection if accepted comprise first and second transit link constraints for transit links in a path between a network node where the request was received from the wireless terminal and a network access point.

9. The method of claim 1 wherein the new connection request was received from a terminal other than the wireless terminal, and the first and second transit link constraints for each transit link designated to handle traffic for the new connection if accepted comprise first and second transit link constraints for transit links in a path between a network node serving the wireless terminal as a destination for the new connection and a network access point.

10. A wireless network node configured to implement the method of claim 1.

11. A non-transitory computer readable medium having computer executable instructions stored thereon that when executed perform the method of claim 1.

12. A wireless mesh network configured to implement the method of claim 1.

13. A system for use in a wireless network comprising a backhaul network and access points configured to provide wireless terminals with wireless access to the wireless network, the system comprising:
- an access link antenna system;
- a transit link antenna system;
- a transit radio connected to the transit link antenna system and configured to communicate with neighbouring network nodes over transit links using the transit link antenna system; and
- a communications controller operable to:
    - receive a new connection request for a new connection with the wireless network from a wireless terminal via the access link antenna system;
    - based upon said new connection request:
        - output a first upstream call admission control (CAC) communication for propagation along a path of transit links selected to handle the new connection for use in determining whether each transit link can handle a voice service associated with the new connection;
        - output a second upstream CAC communication for propagation along the path of transit links selected to handle the new connection for use in determining whether each transit link can handle a data service associated with the new connection;
        - receive a first downstream CAC communication from a node in the path in response to the first upstream CAC communication;
        - receive a second downstream CAC communication from a network node in the path in response to the second upstream CAC communication; and
    - based upon the new connection request, determine if the new connection from the wireless terminal satisfies at least one access link CAC constraint concerning capacity of external access to the wireless network by the wireless terminal;
    - make a first CAC decision based on the at least one access link CAC constraint and a first transit link CAC constraint are satisfied, the first transit link CAC constraint based on the first downstream CAC communication; and
    - make a second CAC decision based on the at least one access link CAC constraint and a second transit link CAC constraint, the second transit link constraint based on the second downstream CAC communication.

14. The system of claim 13 implemented as part of a single wireless network node.

15. The wireless network comprising a plurality of wireless network nodes according to claim 14.

16. The wireless network of claim 15 wherein transit links between the plurality of wireless network nodes form a wireless mesh.

17. A wireless mesh network comprising:
- a backhaul network and access points configured to provide wireless terminals with wireless access to the wireless mesh network;
- the backhaul network and the access points comprising a plurality of wireless network nodes each having an access link antenna system and a transit link antenna system, the plurality of wireless network nodes being interconnected with transit links to form a wireless mesh;
- the wireless mesh network being configured to perform call admission control (CAC) by:
    - receiving a new connection request for a new connection with the wireless network from a wireless terminal;
    - based upon said new connection request:
        - determining if the new connection satisfies at least one access link CAC constraint concerning capacity of external access to the wireless mesh network by the wireless terminal;
        - outputting a first upstream CAC communication for propagation along a path of the transit links designated to handle the new connection for use in determining whether each transit link can handle a voice service associated with the new connection;
        - outputting a second upstream CAC communication for propagation along the path of transit links selected to handle the new connection for use in determining whether each transit link can handle a data service associated with the new connection;

receiving a first downstream CAC communication from a wireless network node in the path in response to the first upstream CAC communication;

receiving a second downstream CAC communication from a network node in the path in response to the second upstream CAC communication;

making a first CAC decision based on the at least one access link CAC constraint and a first transit link CAC constraint, the first transit link CAC constraint based on the first downstream CAC communication; and making a second CAC decision based on the at least one access link CAC constraint and a second transit link CAC constraint, the second transit link constraint based on the second downstream CAC communication.

18. The wireless mesh network of claim 17 wherein the first and second transit link CAC constraints comprise transit link constraints for each transit link designated to handle traffic for the new connection if accepted.

19. The wireless mesh network of claim 17 wherein the first and second transit link CAC constraints are assessed in a distributed manner by network nodes by propagating the first and second upstream CAC communications along the path or paths of the transit links designated to handle the new connection.

20. The wireless mesh network of claim 17 further comprising at least one network access point and wherein call admission control is performed for connection requests received at the at least one network access point for the wireless terminals served by the wireless mesh network.

21. A method for admitting a new connection into a wireless mesh network comprising a plurality of communication nodes, the method comprising:

receiving, at an access communication node of the plurality of communication nodes, a new request for the new connection from a wireless terminal;

determining an access link call admission control (CAC) constraint associated with the access communication node;

determining a path of transit links through which the new connection will be routed, wherein each transit link in the path of transit links is associated with at least one communication node of the plurality of communication nodes;

outputting, by the access communication node, a first upstream CAC communication for propagation along the path of transit links for use in determining whether each transit link can handle a voice service associated with the new connection;

outputting a second upstream CAC communication for propagation along the path of transit links for use in determining whether each transit link can handle a data service associated with the new connection;

receiving, by the access communication node, a first downstream CAC communication from a communication node in the path of transit links sent in response to the first upstream CAC communication which accepts or rejects the new connection based on a transit link CAC constraint associated with the communication node;

receiving, by the access communication node, a second downstream CAC communication from a communication node in the path of transit links sent in response to the second upstream CAC communication which accepts or rejects the new connection based on a transit link CAC constraint associated with the communication node; and making a CAC decision based on the access link CAC constraint, the first downstream CAC communication, and the second downstream CAC communication.

* * * * *